United States Patent

[11] 3,577,202

[72] Inventor Barrie Brightman
Webster, N.Y.
[21] Appl. No. 651,568
[22] Filed July 6, 1967
[45] Patented May 4, 1971
[73] Assignee Stromberg-Carlson Corporation
Rochester, N.Y.

[54] TELEPHONE HYBRID ARRANGEMENT WITH FREQUENCY SEPARATION FOR USE WITH TDM SYSTEMS
6 Claims, 1 Drawing Fig.

[52] U.S. Cl. .......... 179/15A, 178/58, 179/2.5, 179/15FD
[51] Int. Cl. .......... H04j 1/06
[50] Field of Search .......... 179/15, 15 (A), 15 (ART), 18.3 (C), 170 (D), 170 (NHC), 170 (C), 170 (T); 179/15 (ST); 179/2.5; 178/57, 58, 59, 60

[56] References Cited

UNITED STATES PATENTS

| | | | |
|---|---|---|---|
| 1,739,455 | 12/1929 | Habann | 179/2.5(CX) |
| 2,398,755 | 4/1946 | Shepherd | 179/2(DP) |
| 3,213,202 | 10/1965 | Flowers | 179/15X |
| 3,366,738 | 1/1968 | Feder | 179/15 |
| 2,936,338 | 5/1960 | James et al. | 179/15 |
| 3,029,312 | 4/1962 | Kehm | 179/15 |
| 3,205,310 | 9/1965 | Schlichte | 179/15 |

FOREIGN PATENTS

| | | | |
|---|---|---|---|
| 1,023,801 | 2/1958 | Germany | 179/15 |

OTHER REFERENCES

Transmission Systems for Communications, Bell Telephone Laboratories, Vol. 1, pp. 5— 1 and 5-4 to 5-8. Copyright 1959. Copy available from examiner.

*Primary Examiner*—William C. Cooper
*Assistant Examiner*—David L. Stewart
*Attorney*—Charles C. Krawczyk

ABSTRACT: A telephone hybrid system for use with a TDM switching center including filter arrangements at the center and at the subscriber subsets, which serve as hybrid circuits to establish directivity of signalling. A carrier signal at the frequency of the TDM frame rate and derived from the TDM system is used to transmit signals from the switching center to the subsets, thus enabling directional separation by simple filtering.

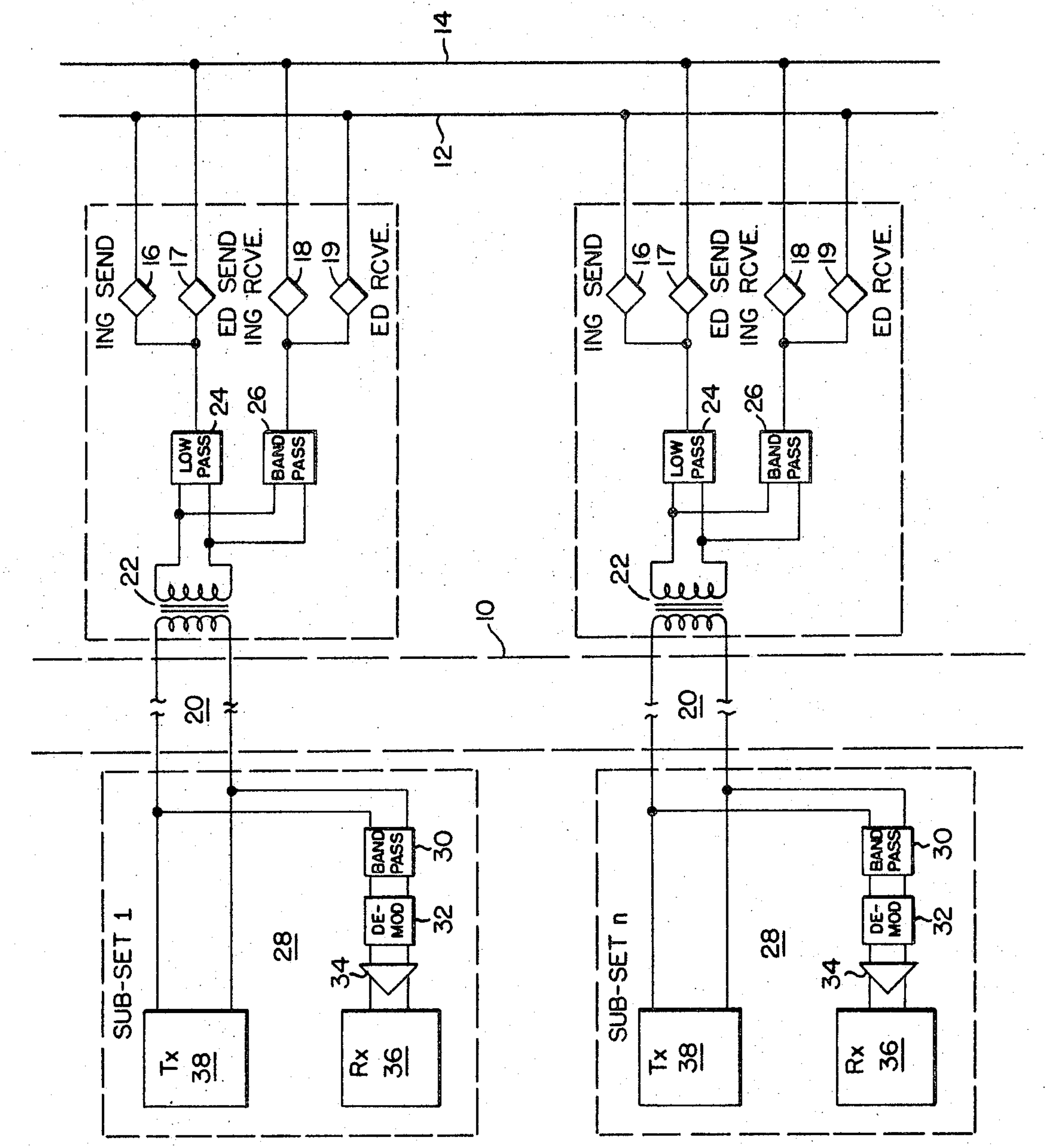
INVENTOR.
BARRIE BRIGHTMAN
BY Hoffman Stone
ATTORNEY

TELEPHONE HYBRID ARRANGEMENT WITH FREQUENCY SEPARATION FOR USE WITH TDM SYSTEMS

BRIEF SUMMARY OF THE INVENTION

This invention relates to a novel telephone-type hybrid arrangement for distinguishing between incoming and outgoing signals that appear on a two-conductor telephone line.

The present invention arose in connection with the development of a switching device of the kind referred to as a line concentrator designed as a small, completely automatic equipment to be mounted in the vicinity of a small cluster of subscribers, say up to about 200, and remote from the main central exchange. The concentrator is connected to the central exchange by only the small number of trunks needed to carry the traffic, or by a single trunk arranged by multiplex techniques to provide the needed number of communications channels, and thus obviates the circuits that would otherwise be required to connect each subset separately to the central exchange.

It was desired to use TDM switching at the concentrator, and to meet modern requirements, particularly as regards insertion loss, it was desired that the switching be on a four-wire basis. Use of four-wire connections between the concentrator and the subsets, or of conventional impedance-dependent hybrid circuits presented problems particularly with regard to cost.

Briefly, the present invention contemplates the use of a carrier signal derived from the TDM switching system and having a frequency equal preferably to the time frame rate of the TDM system, and, alternatively, to any desired harmonic thereof, for transmitting signals to the subsets. The signals from the subsets are transmitted without modulation to the TDM switching system. Directional signalling is thus provided simply by appropriate filtering at the subsets and at the concentrator, because the time frame rate of the TDM system is greater than twice the highest frequency component of the information signal.

Although it is thought that the invention will find its maximum utilization in connection with line concentrator equipment, it is not so limited, but is of general application for use in connection with any TDM switching system as a frequency dependent hybrid arrangement.

DETAILED DESCRIPTION

A presently preferred embodiment of the invention will now be described in detail in connection with the accompanying drawing, wherein the single FIGURE is a schematic diagram partly in block form of a telephone hybrid arrangement in accordance with the invention.

A TDM switching arrangement at a central station, or at a line concentrator is indicated to the right of the right-hand dashed line 10 in the drawing. The switching system is arranged on a four-wire basis, and includes two TDM highways 12 and 14, respectively, and four sets of gates 16, 17, 18, and 19, respectively, for each subscriber's line 20 connected to the station. Any desired system, several of which are known, may be used for operating the gates 16—19 in accordance with predetermined timed sequences to establish time divided communications channels for connecting any selected one of the subscriber's lines 20 through the highways 12 and 14 to any one of the other lines 20 or to a remote switching station. Typically, a time frame of 100 microseconds, corresponding to a frequency of 10 kHz., is used for TDM switching in telephony, and the principle has been established that the time frame rate must be at least twice the rate of the highest frequency component of the information signal to be transmitted.

The subscriber's lines 20 are two-wire lines, and are connected to the gates 16—19 through separate isolating transformers 22 and filter networks 24 and 26. A low pass filter 24 is connected between the transformer 22 of each line and the gates 16 and 17 denoted the SEND gates used for feeding signals from the subscriber's lines onto the highways 12 and 14. A band pass filter 26 is connected between the transformer 22 and the gates 18 and 19, called the RECEIVE gates, used for transmitting signals from the highways 12 and 14 to the subscriber's lines 20. The low pass filter 24 has an upper cutoff at a frequency equal to less than one-half the repetition rate of the time frame of the TDM system. The band pass filter 26 is centered at a frequency equal to the repetition rate of the TDM time frame, and has band pass characteristics adequate to transmit the voice frequency signal.

Each of the subscriber's subsets 28 is equipped with a band pass filter 30, a demodulator 32, and an amplifier 34, all connected between its receiver 36 and the line 20. The transmitter 38 is connected directly to the line 20.

In operation, voice signals from the transmitter 38 at the subset pass through the two-wire line 20, the transformer 22, and the low pass filter 24 to the SEND gates 16 and 17. They are blocked from the RECEIVE gates 18 and 19 by the band pass filter 26. Signals from the RECEIVE gates 18 and 19 pass through the band pass filter 26 and are fed through the transformer 22 onto the subscriber's line 20. The low pass filter 24 blocks signals from the band pass filter 26 from the SEND gates 16 and 17. At the subset 28, the transmitter 38 has a natural high impedance at the band pass frequency, and the signals pass through the band pass filter 30, the demodulator 32 and the amplifier 34 for application to the receiver 36. The amplifier 34 compensates for the line loss, which is greater at the band pass frequencies than at unmodulated voice frequencies. Its amplification factor is selected or adjusted in view of the length of the line 20 and the resulting attenuation of the signals at the band pass frequencies between the switching station and the subset.

The band pass filters 26 at the switching station act not only to block unmodulated voice signals from the RECEIVE gates 18 and 19, but also to derive the carrier signal modulated by the information signal from the relatively brief pulses, typically about 0.4 microseconds in duration issuing from the RECEIVE gates 18 and 19, and to concentrate the energy of the pulses into the pass band. For minimum attenuation in the subscriber's lines 20, the band pass filters 26 and 30 should be set at a frequency equal to the rate of the time frame of the TDM system. If a higher degree of directional discrimination is desired, or if it is desired to use filters having relatively gradual cutoff characteristics, the band pass filters 26 and 30 may be set at any desired harmonic of the basic frequency generated by the time frame of the TDM system. In such cases, compensation for the increased line attenuation may be provided for by using more powerful amplifiers 34 at the subsets.

I claim:

1. A telephone hybrid arrangement for use in conjunction with switching equipment of the time division multiplex type comprising:
   a. means for deriving a signal from the switching equipment including a carrier component based on the time division multiplex frame rate,
   b. means for feeding said signal including the carrier component onto a two-wire transmission line leading to a substation,
   c. means at the substation for feeding voice signals onto the transmission line,
   d. means for directing voice signals from the transmission line into the time division multiplex system,
   e. means for blocking signals from said deriving means from entering the time division multiplex system, and
   f. means at said substation connected to said transmission line for deriving voice signals from said signal including the carrier component.

2. A telephone hybrid arrangement for use in conjunction with a telephone system of the kind wherein a telephone subset is connected by a two-wire line to a time division multiplex switching center comprising:
   a. a low pass filter at the switching center connected between the two-wire line and inputs to the time division multiplex highway, b. a band pass filter at the switching center connected between the two-wire line and outputs from the time division multiplex highway for transmitting signals including carrier components based upon the time division multiplex switching rate to the two-wire line, the low frequency cutoff of said band pass filter being higher than the cutoff frequency of said low pass filter, and a substation including means for applying signals within the frequency range passed by said low pass filter to said two-wire line, and means for deriving signals from said signals including carrier components.

3. A telephone hybrid arrangement for use in conjunction with a telephone system of the kind wherein a telephone subset is connected by a two-wire line to a time division multiplex switching center comprising:

a. a low pass filter at the switching center connected between the two-wire line and inputs to the time division multiplex highway, b. a band pass filter at the switching center connected between the two-wire line and outputs from the time division multiplex highway for transmitting signals including carrier components based upon the time division multiplex switching rate, the low frequency cutoff of said band pass filter being higher than the cutoff frequency of said low pass filter, c. a band pass filter at the subset connected between the two-wire line and the subset receiver and having generally similar band pass characteristics as said band pass filter at the center, d. a demodulator connected at the subset between said band pass filter thereat and the receiver, and e. means at said subset connected to apply signals from the subset transmitter to the two-wire line.

4. A telephone hybrid arrangement according to claim 3, and further including an amplifier connected at the subset between the receiver and said band pass filter thereat.

5. A telephone hybrid arrangement according to claim 3, wherein said band pass filters are centered at a frequency equal to the time frame rate of the time division multiplex system.

6. A telephone hybrid arrangement according to claim 3, wherein said band pass filters are centered at a frequency equal to a selected harmonic of the time frame rate of the time division multiplex system.